United States Patent [19]

Nakahara

[11] Patent Number: 4,860,278
[45] Date of Patent: Aug. 22, 1989

[54] OPTICAL RECORDING CARRIER, AND RECORDING-READING APPARATUS, AND RECORDING-READING PROCESS, EMPLOYING THE SAME

[75] Inventor: Takashi Nakahara, Tokyo, Japan
[73] Assignee: Canon Kabushiki Kaisha, Tokyo, Japan
[21] Appl. No.: 143,052
[22] Filed: Jan. 12, 1988
[30] Foreign Application Priority Data

Jan. 13, 1987 [JP] Japan .............................. 62-007283

[51] Int. Cl.$^4$ .............................................. G11B 3/60
[52] U.S. Cl. ................... 369/271; 360/98.08; 360/99.05
[58] Field of Search ............ 369/270, 271, 98.08, 369/99.05

[56] References Cited

U.S. PATENT DOCUMENTS

| 3,870,321 | 3/1975 | Smith et al. | 369/270 |
| 3,871,663 | 3/1975 | Stave | 369/270 |
| 4,320,833 | 3/1982 | Antoniotti et al. | 369/271 |

FOREIGN PATENT DOCUMENTS 90268 5/1984 Japan ................... 369/270

*Primary Examiner*—Steven L. Stephan
*Attorney, Agent, or Firm*—Fitzpatrick, Cella, Harper & Scinto

[57] ABSTRACT

An optical recording carrier for recording and/or reading information by irradiation with light comprises a conductive material layer capable of being electrostatically charged.

An optical card comprises a recording layer and a substrate, wherein said optical card has a conductive material layer capable of being electrostatically charged.

A recording and/or reading apparatus employing an optical recording carrier or an optical card comprises a means for keeping electrostatically charged a plate constituting an optical recording carrier or optical card holder of which an optical recording carrier or optical card having a conductive material layer capable of being electrostatically charged is placed, to attract said optical recording carrier or optical card to said optical recording carrier or optical card holder by Coulomb's power, and a means for driving said optical recording carrier or optical card.

A recording and/or reading process employing an optical recording carrier or an optical card comprises keeping electrostatically charged in mutually opposite polarity, both of an optical recording or optical card having a conductive material layer capable of being electrostatically charged and a plate constituting an optical recording carrier or optical card holder of a recording and/or reproducing apparatus, to attract said optical recording carrier or optical card to said optical recording carrier or optical card holder in close contact, and effecting irradiation with light under this state to carry out the recording and/or reading.

55 Claims, 3 Drawing Sheets

OPTICAL RECORDING CARRIER, AND RECORDING-READING APPARATUS, AND RECORDING-READING PROCESS, EMPLOYING THE SAME

BACKGROUND OF THE INVENTION

1. Field of the invention

The present invention relates to an optical recording carrier, and a recording-reading apparatus, and a recording-reading process, employing the same. More particularly, it is concerned with an optical recording carrier that records and/or reads information by irradiation with light, and a recording-reading apparatus, and a recording-reading process, employing the same.

2. Related Background Art

Conventionally, the optical recording carrier is known to include optical magnetic discs, optical discs, optical cards, thin-shaped optical discs enclosed with card-like cases, and so forth. In instances in which the optical recording carrier is carried, however, since the optical cards or the thin-shaped optical discs enclosed with card-like cases (hereinafter "card discs"), for example, are so designed that they can be used by being carried by users, it may frequently occur that the optical cards or card discs are deformed by external force when carried, particularly when carried by being put in a purse or the like, and thus the flatness at the time of the production of the optical cards or card discs can not be maintained. The optical discs or the optical magnetic discs are also liable to be deformed when carried.

Whereas, in general, a beam of light irradiated for carrying out recording and/or reading information on a recording layer of the optical recording carrier is required to be made vertically incident on the recording layer. More specifically, if the beam of light is obliquely incident on the recording layer, the spot is given in an elipsoidal shape, so that it is liable that no pit is formed precisely on the recording layer, the information in an adjacent track also is detected to cause the crosstalk, or the return light of the beam of light reflected on the recording layer is not incident on the light-pickup lens to make it impossible to reproduce the information. For this reason, as a means for correcting the deformation such as bend or twist of the optical recording carrier, Japanese Utility Model Unexamined Publication No. 183954/1985 discloses an example in which the vicinity of the part of an optical disc on which part a laser beam flux is reflected is interposed between facing rollers in the form of a sandwich to correct the deformation. However, in the instance of a disc rotating at a high speed, it is liable that no stable rotation can be attained as the disc is interposed between the rollers and also the disc is slightly vibrated as the deformed part comes into contact with the rollers. More specifically, because of the continual change in a focal plane owing to the slight vibration, the autofocusing of pickup can not be followed to make it even impossible to carry out the recording and/or reading.

Namely, as will be seen in the above prior art, no sufficient correction can be achieved against the various types of deformation such as bend, curve and twist of the optical recording carrier if measures are taken only from the aspect of the apparatus.

Moreover, in conventional optical recording carriers, no means for correcting the deformation is taken into account on the part of the optical recording carrier, because they comprise, for example as shown in FIG. 6, a first light-transmissive resin substrate constituting a substrate 1 of the optical recording carrier, an optical recording medium layer 3 that performs the recording by light energy, a second resin substrate corresponding to a protective layer 2 for protecting said optical recording medium layer, and an adhesive layer 8 for adhering said resin substrate. Accordingly, it has been difficult to perform a stable recording and/or reading on the deformed optical recording carrier.

SUMMARY OF THE INVENTION

An object of the present invention is to provide an optical recording carrier that can readily solve the problems the conventional optical recording carriers have had, i.e., the problems caused by the deformation of the optical recording carrier, without adversely affecting the precision of the recording and/or reading when the recording and/or reading is carried out.

Another object of the present invention is to provide a recording and/or reading apparatus employing the optical recording carrier, which apparatus can solve the problems caused by the deformation of the optical recording carrier, without adversely affecting the precision of the recording and/or reading when the recording and/or reading is carried out.

A further object of the present invention is to provide a recording and/or reading process employing the optical recording carrier, which process can solve the problems caused by the deformation of the optical recording carrier and can perform the recording and/or reading in a good precision.

More specfically, the optical recording carrier according to the present invention is an optical recording carrier that records and/or reading information by irradiation with light, and is characterized by having a conductive material layer capable of being electrostatically charged.

The optical card having a recording layer and a substrate, characterized in that said optical card has a conductive material layer capable of being electrostatically charged.

The recording and/or reading apparatus employing the optical recording carrier according to the present invention is characterized by having a means for keeping electrostatically charged a plate constituting an optical recording carrier holder on which an optical recording carrier having a conductive material layer capable of being electrostatically charged is placed, to attract said optical recording carrier to said optical recording carrier holder by Coulomb's power, and a means for driving said optical recording carrier.

The recording and/or reading apparatus employing the optical card according to the present invention is characterized by having a means for keeping electrostatically charged a plate constituting an optical card holder on which an optical card having a conductive material layer capale of being electrostatically charged is placed, to attract said optical card to said optical card holder by Coulomb's power, and a means for driving said optical card.

The recording and/or reading process employing the optical recording carrier according to the present invention is characterized by comprising keeping electrostatically charged in mutually opposite polarity, both of an optical recording carrier having a conductive material layer capable of being electrostatically charged and a plate constituting an optical recording carrier holder of a recording and/or reading apparatus, to attract said optical recording carrier to said optical recording carrier holder in close contact, and effecting irradiation with light under this state to carry out the recording and/or reading.

The recording and/or reading process employing the optical card according to the present invention is characterized by comprising keeping electrostatically charged in mutually opposite polarity, both of an optical card having a conductive material layer capable of being electrostatically charged and a plate constituting an optical card holder of a recording and/or reading apparatus, to attract said optical card to said optical card holder in close contact, and effecting irradiation with light under this state to carry out the recording and/or reading.

Namely, in the present invention, the optical recording carrier can be attracted to the optical recording carrier holder in close contact by the electrostatic force produced between the optical recording carrier and the optical recording carrier holder, so that it is unnecessary to use an external mechanical means for contact-bonding the optical recording carrier. Accordingly, there may occur no problem such that the slight vibration is caused when the deformation of an optical disc is corrected by the rollers mentioned above, and it becomes possible to carry out the recording and/or reading in a stable state on the deformed optical recording carrier, thus solving the problems conventionally involved.

BRIEF DESCRIPTION OF THE INVENTION

DETAILED DESCRIPTION OF THE PREFERRED EMBODIMENTS

Figure 1:
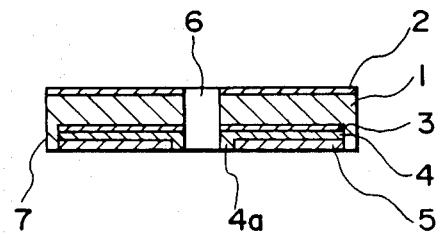
FIG. 1 is a cross-section illustrating the constitution of an embodiment of the optical recording carrier according to the present invention.

FIG. 1 is a cross-section illustrating the constitution of an embodiment of the optical recording carrier according to the present invention. In FIG. 1, the optical recording carrier of the present invention comprises a disc-like substrate 1 provided with a guide hole 6 bored on its central part, a side wall 7 provided on the peripheral part of one face of the substrate 1, an optical recording medium layer 3 and a conductive material layer 4 laminated in succession on said face of the substrate, an insulating material layer 5 provided on said conductive material layer 4 to protect it, a stripe-like electrode 4a provided at the part at which it comes into contact with the guide hole 6 of said insulating material layer 5 so as to be connected to the conductive material layer 4, and a protective layer 2 provided on the outer side of another face of the substrate 1.

In the present invention, the conductive material layer 4 is formed with a conductive member capable of being electrostatically charged by the application of a voltage, and transparent or opaque to the recording-reading light, for which material there may be used, for example, aluminum, tin oxide, indium oxide, copper, gold, etc.

The conductive material layer can be formed by methods such as vapor deposition, ion plating, sputtering and electroless plating. Also, the conductive material layer may desirably have a thickness usually of from 100 to 10,000 Å, preferably from 500 to 2,000 Å.

When the conductive material layer is provided on the optical recording carrier, the conductive material layer may preferably be provided at a directly upper side or lower side of the optical recording medium layer from the viewpoint of the correction of the deformation of the recording face. It can be laminated on the carrier with an area arbitrarily set depending on the material, size, thickness, purpose, etc. of the optical recording carrier, and desirably with an area usually of 20% or more, preferably 50% or more, of the whole area of the optical recording carrier. It may also be partially provided in several spots or at a given part, or may be provided on the whole face.

Figure 2:
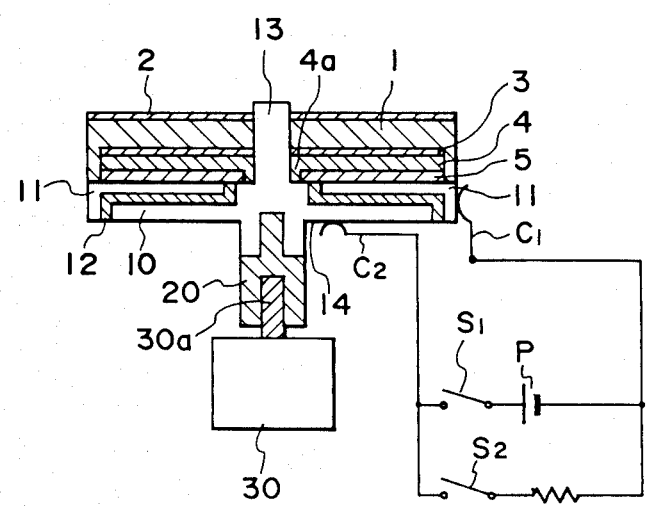
FIG. 2 is a cross-section illustrating an embodiment of the optical recording carrier according to the present invention and the recording and/or reading apparatus employing it.

The electrode 4a provided on said carrier is provided for the purpose of connecting a high pressure electric source P shown in FIG. 2 and the conductive material layer 4 and in such a manner that the conductive material layer of the optical recording carrier may be brought into contact with a base 10 of the recording and/or reading apparatus shown in FIG. 2, and there can be used a thin film made of gold, copper, rhodium, etc., which can be formed by vapor deposition, ion plating, sputtering, etc. The electrode 4a may also be provided at a part of the optical recording carrier, or partially, so long as it is in contact with the conductive material layer of the optical recording carrier and the base of the recording and/or reading apparatus.

The insulating material layer 5 is provided as an outermost layer of the optical recording carrier, except for the part of the electrode 4a. In place of the insulating material layer 5, an insulating material layer may be provided on the part other than the base being in contact with the conductive material layer 4 or the electrode 4a of the optical recording carrier placed on the surface of the optical recording carrier holder of the recording and/or reading apparatus.

In this embodiment, the side wall 7 may be provided, and is effective for preventing the optical recording medium layer or the conductive material layer from being deteriorated or corroded by moisture or the like in the air because of the exposure of the optical recording medium layer or the conductive material layer to an edge face of the optical recording carrier.

In the present invention, the substrate 1 constitutes a support for the optical recording carrier, for which an optically transparent member is used, and examples thereof may include polycarbonate, polymethyl methacrylate, polyacrylate, etc.

Used for the protective layer 2 are materials having a higher hardness than the substrate for the purpose of protecting the substrate surface and those being optically transparent, and there may preferably be used, for example, thermo- or photo-setting coating materials of a silicone type, melamine type, urethane type, acrylic type, etc.

Used for the optical recording medium layer 3 are materials selected in a wide range regardless of the recording by heat mode or recording by photon mode so long as they can record information by light energy, and there may be included, for example, as organic coloring matters, polymethine type dyes such as cyanine, naphthoquinone type or phthalocyanine type pigments, etc.; and as metals or semimetals, low-boiling substances such as Bi, Sn and Te, or composite compounds obtained by combining with these, As, Se, S, O, C, etc., and also Te-TeO$_2$ type materials capable of effecting the recording by phase transition, or silver halides capable of effecting the recording by change in optical density.

The optical recording medium layer may desirably have a thickness usually of 200 Å to 10,000 Å, preferably 1,000 Å to 2,000 Å.

The insulating material layer 5 is provided as an outermost layer of the optical recording carrier, and provided for the purpose of preventing the conductive material layer 4 except for the electrode 4a from being in direct contact with outside metals, and for protecting the conductive material layer 4. Any usual insulating materials can be used as the insulating material layer without any particular limitation, which materials may include, for example, polycarbonate, polymethyl methacrylate, etc.

The guide hole 6 is provided at the center of the substrate 1, to the inner face of which the electrode 4a is exposed.

Here will be described below the recording apparatus, reading apparatus or recording-reading apparatus, and recording process, reading process, or recording-reading process for carrying out the recording, reading, or recording-reading on the optical recording carrier according to the present invention. FIG. 2 is an explanatory view illustrating an embodiment of the recording and/or reading apparatus according to the present invention.

In FIG. 2, the numeral 10 denotes a base made of a conductive material and serving as an electrode for feeding electrostatic charge to the conductive material layer 4 capable of being charged with + or − electrostatic charge, and the numeral 11 denotes a plate capable of being charged with a charge of the kind different from the the electrostatic charge possessed by the conductive material layer. At the central part of the base 10, provided is a guide shaft 13 to which the guide hole 6 provided in the optical recording carrier is fitted. This guide shaft 13 is integrally formed at the rotation central part of the base 10 and with use of a material same with, or a material different from, that for said base 10, and is a guide shaft for setting the position at which the optical recording carrier is placed.

The numeral 14 denotes an electrode surface provided at part of the base 10, slidably to an electric source feeding brush $C_2$. The plate 11 is also fixed to the flange of the base 10, in the manner integral with the base 10, with the interposition of an insulating material 12, and the peripheral side face thereof slidably comes into contact with an electric source feeding brush $C_1$, also forming a face on which the carrier is placed. The numeral 12 denotes an insulating material for electrically insulating the base 10 from the plate 11; 20, a spacer for electrically insulating a motor shaft 30a from the base 10 and integrally fixing the motor shaft 30a with the base 10; 30, a driving motor for rotating the base 10; P, a high-voltage electric source for applying a voltage to the plate 11 and the conductive material layer 4; $S_1$, a first switch for instantaneously applying a voltage to the plate 11 and the conductive material layer 4; $S_2$, a second switch for bringing the voltage applied to the plate 11 and the conductive material layer 4 into a state of equilibrium; $C_1$, a first brush slidably coming into contact with the plate 11, for applying a voltage thereto; and $C_2$, a second brush slidably coming into contact with the electrode surface 14 provided on the base 10, for applying a voltage thereto.

In the above constitution, the optical recording carrier is detachably fitted to the guide shaft 10a through the guide hole 6, and placed on the plate 11 forming the face on which the optical recording carrier is placed, by use of a carrier placing means (not shown). Here, the electrode part 4a of the conductive material layer 4 provided in the optical recording carrier slidably comes into contact with the guide shaft 13 to make an electrifiable state. In the above state, once the first switch $S_1$ is turned on for an instant by means of a switching operation means (not shown) (here, the switch $S_2$ is in the open state), a negative charge is applied to the plate 11 that is slidably in contact with the brush $C_1$, through the brush $C_1$ connected to the negative pole of the high-voltage electric source P. On the other hand, through the switch $S_1$, electricity is led to the brush $C_2$ connected to the positive pole side of the high-voltage electric source P to electrify the guide shaft 13 through the electrode face 14 having slidably come into contact with the brush $C_2$, so that a positive charge is applied to the conductive material layer 4 through the electrode 4a on the side of the carrier. This operation makes the conductive material layer 4 of the optical recording carrier and the plate 11 electrostatically charged in respectively opposite charges, so that the optical recording carrier is pressed against the plate 11 through the insulating material layer 5 by the electric attraction force corresponding to the applied voltage, and thus the deformation present in the optical recording carrier can be corrected in line with the face of the plate 11, fixing the optical recording carrier to the plate 11.

In this instance, it is desired for the electric charges of the static electricity on the charged conductive material layer 4 and plate 11 to be uniformly distributed, and the charge may desirably be effected with an electric field strength usually of from $1.9 \times 10^6$ V/m to $6 \times 10^6$ V/m, preferably from $2.10 \times 10^6$ V/m to $2.98 \times 10^6$ V/m.

Next, the fixation of the optical recording carrier is confirmed by use of a means for detecting the manner of fixation of optical recording carrier (not shown), and the driving motor 30 is rotated by means of a motor-driving circuit (not shown). Then, the information is recorded-read on the optical recording carrier by light energy.

When the optical recording carrier is thereafter detached from the plate 11, the static electricity generated by the above means may be shorted to bring the electric charge into a state of equilibrium. More specifically, the switch $S_2$ is brought from the open state into the closed state, i.e., turned on, whereby the electric charge stored in the conductive material layer 4 passes from the electrode 4a to the switch $S_2$ through the guide shaft 13, electrode face 14 and brush $C_2$, shorting the first brush $C_1$ and plate 11, and the electric potential difference between the plate 11 and conductive material layer 4 turns to zero with disappearance of the static electricity, so that the optical recording carrier is brought into the state in which it can be detached from the plate 11.

Figure 3:
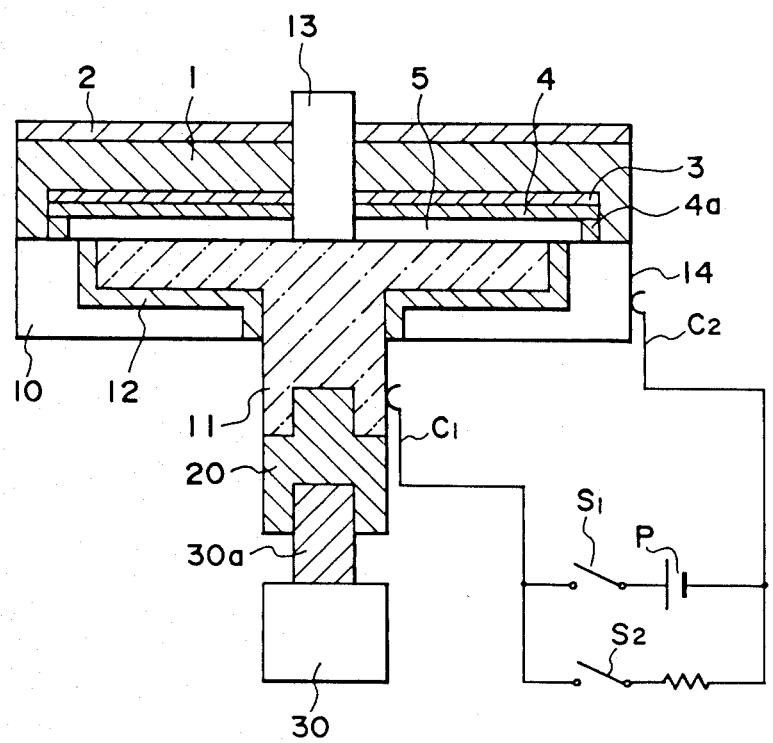
FIG. 3 is a cross-section illustrating another embodiment of the optical recording carrier according to the present invention and the recording and/or reading apparatus employing it.

As described above, the present invention can be satisfactory if the conductive material layer 4 is provided in the optical recording carrier, the static electricity is generated between it and the plate 11 of the holder on which the optical recording carrier is placed, and the electric attraction force thus produced can correct the deformation present in the optical recording carrier, simultaneously serving as a means for fixing the optical recording carrier to the holder. Accordingly, the disposition of the conductive material layer 4, base 10, plate 11, electrode 4a, electrode surface 14, brushes $C_1$ and $C_2$, etc. may not be restricted to that of the above apparatus. For example, as shown in FIG. 3, the electrode 4a may be provided at a lower part of the outer peripheral part of the optical recording medium layer 3, and, in such an instance, the base 10, plate 11, insulating material 12 and brushes $C_1$ and $C_2$ of the recording-reading apparatus may be constructed as illustrated in FIG. 3.

Figure 4:
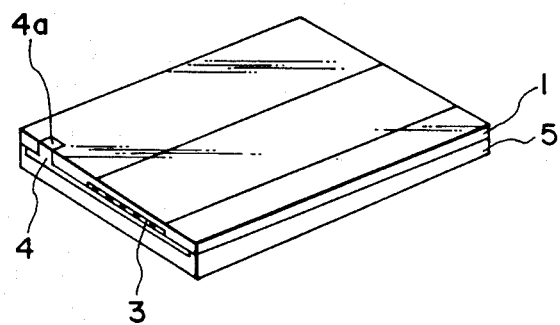
FIG. 4 is a perspective view illustrating another embodiment of the optical recording carrier according to the present invention.

Next, FIG. 4 is a perspective view illustrating another example of the optical recording carrier of the present invention, to illustrate a optical recording carrier in the form of a card.

Figure 5:
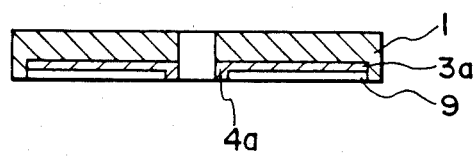
FIG. 5 is a cross section illustrating the constitution of still another embodiment of the optical recording carrier according to the present invention.
Figure 6:
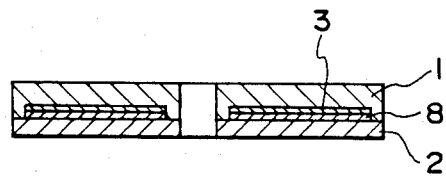
FIG. 6 is a cross section illustrating the constitution of a conventional optical recording carrier.

FIG. 5 is a cross-section illustrating still another example of the optical recording carrier of the present invention, to illustrate an example in which the optical recording medium layer serves simultaneously as the conductive material layer. In the figure, the numeral 3a denotes the optical recording medium layer (for example, a film deposited with bismuth or tin which is a thin film of a low-melting metal) serving simultaneously as the conductive material layer and on which the optical recording or reading is effected. The numeral 9 denotes a protective layer formed with an electrically insulating material and simultaneously making the protection of the optical recording medium layer. The numeral 4a denotes an electrode connected to the optical recording medium layer and provided for the purpose of electrifying the optical recording medium layer from an outer electric source.

In the above constitution in FIG. 5, the electric charge is applied to the electrode 4a by use of the means for applying electrostatic charge as illustrated in the optical recording-reading apparatus of FIG. 2 described above, whereby the optical recording medium layer 3a is charged in either positive charge or negative charge to produce the electrostatic attraction force, so that the optical recording carrier can be fixed on the holder. Also, since in this optical recording carrier the optical recording medium layer serves simultaneously as the conductive material layer, the layers constituting the optical recording carrier is less by one layer than the example of the optical recording carrier illustrated in FIG. 1. Accordingly, the steps for producing the optical recording carrier can be simplified, making low the cost.

The optical recording carrier having the constitution as described above, and the recording-reading apparatus and recording-reading process employing the same can attain the following effect:

(1) The deformation such as bend and twist of the optical recording carrier can be corrected with ease, and stable recording and/or reading can be performed.

(2) The electrostatic attraction force can fix the optical recording carrier to the holder of the recording and/or reading apparatus at the same time the deformation of the optical recording carrier is corrected.

(3) The optical recording carrier can be fixed to, or released from, the holder of the recording and/or reading apparatus with a simple mechanism.

EXAMPLES

The present invention will be described below in greater detail by giving Example.

EXAMPLE 1

The optical recording carrier as illustrated in FIG. 1 was prepared according to the following process.

A polymethine type dye represented by structural formula (I) shown below was dissolved in a solvent and coated on the substrate 1 made of transparent polymethyl methacrylate of 400 μm in sheet thickness and 40 mm in diameter, provided at its central part with the guide hole of 6 mm in diameter, to form the optical recording medium layer 3 of 900 to 1,000 Å in thickness.

Structural formula (I):

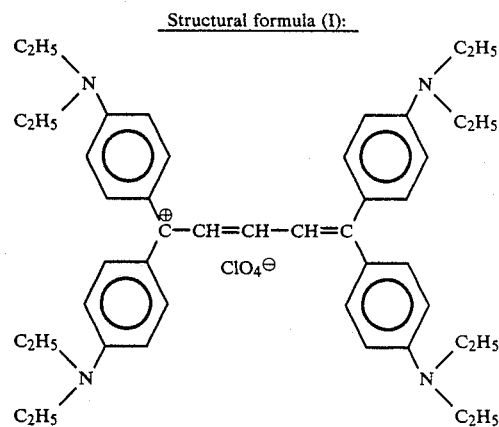

Subsequently, copper was deposited on said optical recording medium layer 3 to form the conductive material layer 4 of 2,000 Å thick, on which the electrode 4a of 15 μm thick was provided by sputtering, followed by the adhering of polymethyl methacrylate of 300 μm thick to form the insulating material layer 5.

On the other hand, an optically transparent polyfunctional acrylic type ultraviolet-curable coating material was coated on the opposite side of the substrate 1 to form thereon the protective layer 2 of 20 μm thick, thus producing the optical recording carrier.

Next, the optical recording carrier was set on the optical recording-reading apparatus shown in FIG. 2 under the following conditions:

(1) Thickness of the plate 11: 1 mm; made of: brass material (brass)

(2) Thickness of the insulating material 12: 1 mm; made of: polycarbonate (3) Thickness of the base 10: 2 mm; made of: brass material (4) Applied voltage between the brushes $C_1$ and $C_2$: about 3.7 kV (5) Effective area for producing the electrostatic attraction force was controlled to about 83% of the whole area of the optical recording carrier (40 mm in diameter).

(6) Weight of the optical recording carrier: about 1 g.

Under the above conditions, the air gap between the bottom face of the optical recording carrier and the plate 11 was controlled to 0.5 mm in a state that the optical recording carrier had not yet been brought into contact with the face of the plate 11, whereat a voltage of 3.7 kV was applied between the brushes $C_1$ and $C_2$. In consequence, about 10 gf of electrostatic attraction force was produced, whereby the optical recording carrier of about 1 g in weight was attracted to the plate 11, and brought into close contact with the face of the plate 11.

After the close contact, the air gap between the plate 11 and the face of insulating material layer 5 serving as the bottom face of the optical recording carrier was zero in dimension. However, assuming that there is given a gap of 0.01 mm, the attraction force at that time is brought in about 6.4 kgf, and the optical recording carrier is fixed in the form sufficiently according with the face of the plate 11. Therefore, the optical positional relationship with an optical head (not shown) was precisely maintained, and it was possible to take out a light signal with good precision.

What I claim is:

1. An optical recording carrier comprising an optical recording layer adapted to be irradiated with light for recording information thereon or reading information therefrom, and a conductive material layer capable of being electrostatically charged for generating electrostatic force between said optical recording carrier and a recording and/or reading apparatus.

2. The optical recording carrier of claim 1, wherein an electrode for feeding electrostatic charge to the conductive material layer is provided.

3. The optical recording carrier of claim 2, wherein said electrode is provided outside the optical recording zone.

4. The optical recording carrier of claim 2, wherein said electrode is so provided as to come into contact with a base of a recording and/or reading apparatus.

5. The optical recording carrier of claim 1, wherein the conductive material layer includes an electrode, and an electrically insulating material layer is provided on a portion of an outer side of said conductive material layer and spaced from said electrode.

6. The optical recording carrier of claim 1, wherein said optical recording carrier has an insulating material layer, a conductive material layer, a recording layer and a substrate, as a basic constitution.

7. The optical recording carrier of claim 1, wherein said optical recording carrier has an insulating material layer, a conductive material layer, a recording layer and a substrate, as a basic constitution.

8. The optical recording carrier of claim 1, wherein said optical recording carrier has a conductive material layer, a recording layer and a substrate, as a basic constitution.

9. An optical card comprising a optical recording layer adapted to be irradiated with light for recording information thereon or reading information therefrom a substrate, and a conductive material layer capable of being electrostatically charged for generating an electrostatic force between said optical card and a recording and/or reading apparatus.

10. The optical card of claim 9, wherein an electrode for feeding electrostatic charge to the conductive material layer is provided.

11. The optical card of claim 10, wherein said electrode is provided outside the optical recording zone.

12. The optical card of claim 10, wherein said electrode is so provided as to come into contact with a base of a recording and/or reading apparatus.

13. The optical card of claim 9, wherein an electrically insulating material layer is provided on the outer side of said conductive material layer, except for an electrode portion.

14. The optical card of claim 9, wherein said optical card has an insulating material layer, a conductive material layer, a recording layer and a substrate, as a basic constitution.

15. The optical card of claim 9, wherein said optical card has an insulating material layer, a conductive material layer, a recording layer and a substrate, as a basic constitution.

16. The optical card of claim 9, wherein said optical card has a conductive material layer, a recording layer and a substrate, as a basic constitution.

17. A recording and/or reading apparatus comprising:
an optical recording carrier having a conductive material layer capable of being electrostatically charged; and
an optical recording carrier holder drivingly connected to a drive means, said optical recording carrier holder including a plate capable of being electrostatically charged for coupling said optical recording carrier to said drive means.

18. The recording and/or reading apparatus of claim 17, wherein said optical recording carrier holder comprises a base serving as an electrode for feeding electrostatic charge to said conductive material layer, and a plate capable of being charged with a charge of the kind different from, or same with, the electric charge possessed by said conductive material layer.

19. The recording and/or reading apparatus of claim 17, wherein said recording and/or reading apparatus employing the optical recording carrier comprises a means for causing the electric charge possessed by said conductive material layer and said plate to disappear.

20. The recording and/or reading apparatus of claim 19, wherein said plate and said base are so constructed that they can be shorted therebetween to release the electrostatic attraction of said optical recording carrier to said optical recording carrier holder.

21. The recording and/or reading apparatus of claim 17, wherein at least an insulating material is provided between said plate and said base.

22. The recording and/or reading apparatus of claim 17, wherein the apparatus comprises a means for rotating said optical recording carrier as a means for driving said optical recording carrier.

23. The recording and/or reading apparatus of claim 17, wherein the apparatus comprises a means for reciprocating said optical recording carrier as a means for driving said optical recording carrier.

24. A recording and/or reading apparatus comprising:
an optical card having a conductive material layer capable of being electrostatically charged;
an optical card holder including a plate capable of being electrostatically charged;
charging means for electrostatically charging said plate of said optical card holder by Coulomb's power thereby coupling the optical card to the optical card holder; and
means for driving said optical card.

25. The recording and/or reading apparatus of claim 24, wherein said optical card holder comprises a base serving as an electrode for feeding electrostatic charge to said conductive material layer, and a plate capable of being charged with a charge of the kind different from, or same with, the electric charge possessed by said conductive material layer.

26. The recording and/or reading apparatus of claim 24, wherein said recording and/or reading apparatus employing the optical card comprises a means for causing the electric charge possessed by said conductive material layer and said plate to disappear.

27. The recording and/or reading apparatus of claim 26, wherein said plate and said base are so constructed that they can be shorted therebetween to release the electrostatic attraction of said optical card to said optical card holder.

28. The recording and/or reading apparatus of claim 24, wherein at least an insulating material is provided between said plate and said base.

29. A recording and/or reading process employing an optical recording carrier having a conductive material layer capable of being electrostatically charged and an optical recording carrier holder mounted in a recording and/or reading apparatus and having a plate capable of being electrostatically charged, comprising the steps of:
maintaining electrostatic charges of mutually opposite polarity in the conductive material layer of the optical recording carrier and the plate of the optical recording carrier holder for coupling the optical recording carrier to the recording and/or reading apparatus; and
irradiating the optical recording carrier with light during the step of maintaining to perform recording and/or reading.

30. The recording and/or reading process of claim 29, wherein, after the recording and/or reading has been performed on said optical recording carrier, the electrostatic charge possessed by said conductive material layer and said plate is caused to disappear to release the attraction of said optical recording carrier to said holder.

31. The recording and/or reading process of claim 29, wherein, after the recording and/or reading has been performed on said optical recording carrier, both of said conductive material layer and said plate is caused to be electrostatically charged in the same polarity to release the attraction of said optical recording carrier to said holder.

32. The recording and/or reading process of claim 29, wherein an electric field is applied to said plate and said conductive material layer with a strength of from $1.9 \times 10^6$ V/m to $6 \times 10^6$ V/m 33. The recording and/or reading process of claim 32, wherein an electric field is applied to said plate and said conductive material layer with a strength of from $2.10 \times 10^6$ V/m to $2.98 \times 10^6$ V/m.

34. The recording and/or reading process of claim 29, wherein an electrode for feeding electrostatic charge to the conductive material layer is provided.

35. The recording and/or reading process of claim 34, wherein said electrode is provided outside the optical recording zone.

36. The recording and/or reading process of claim 34, wherein said electrode is so provided as to come into contact with a base of a recording and/or reading apparatus.

37. The recording and/or reading process of claim 29, wherein an electrically insulating material layer is provided on the outer side of said conductive material layer, except for an electrode portion.

38. The recording and/or reading process of claim 29, wherein said optical recording carrier has an insulating material layer, a conductive material layer, a recording layer and a substrate, as a basic constitution.

39. The recording and/or reading process of claim 29, wherein said optical recording carrier has an insulating material layer, a conductive material layer, a recording layer and a substrate, as a basic constitution.

40. The recording and/or reading process of claim 29, wherein said optical recording carrier has a conductive material layer, a recording layer and a substrate, as a basic constitution.

41. A recording and/or reading process of claim 29 including the further step of forming said conductive material layer so that it is 20% or more of an entire area of the optical recording carrier.

42. A recording and/or reading process of claim 29 including the further step of forming said conductive material layer so that it is 50% or more of an entire area of the optical recording carrier.

43. A recording and/or reading process of claim 41 wherein said conductive material layer is an optical recording layer.

44. A recording and/or reading process employing an optical card having a conductive material capable of being electrostatically charged and an optical card holder mounted in a recording and/or reading apparatus and having a plate capable of being electrostatically charged, comprising the steps of:
maintaining electrostatic charges of mutually opposite polarity in the conductive material layer of the optical card and the plate of the optical card holder for coupling the optical card to the recording and/or reading apparatus; and
irradiating the optical card with light during the step of maintaining to perform recording and/or reading.

45. The recording and/or reading process of claim 44, wherein, after the recording and/or reading has been performed on said optical card, the electrostatic charge possessed by said conductive material layer and said plate is caused to disappear to release the attraction of said optical card to said holder.

46. The recording and/or reading process of claim 44, wherein, after the recording and/or reading has been performed on said optical card, both of said conductive material layer and said plate is caused to be electrostatically charged in the same polarity to release the attraction of said optical card to said holder.

47. The recording and/or reading process of claim 44, wherein an electrode for feeding electrostatic charge to said conductive material layer is provided.

48. The recording and/or reading process of claim 47, wherein said electrode is provided outside the optical recording zone.

49. The recording and/or reading process of claim 47, wherein said electrode is so provided as to come into contact with a base of a recording and/or reading apparatus.

50. The recording and/or reading process of claim 44, wherein an electrically insulating material layer is provided on the outer side of said conductive material layer, except for an electrode portion.

51. The recording and/or reading process of claim 44, wherein said optical card has an insulating material layer, a conductive material layer, a recording layer and a substrate, as a basic constitution.

52. The recording and/or reading process of claim 44, wherein said optical card has an insulating material layer, a conductive material layer, a recording layer and a substrate, as a basic constitution.

53. The recording and/or reading process of claim 44, wherein said optical card has a conductive material layer, a recording layer and a substrate, as a basic constitution.

54. The recording and/or reading process of claim 44, wherein an electric field is applied to said plate and said conductive material layer with a strength of from $1.9 \times 10^6$ V/m to $6 \times 10^6$ V/m 55. The recording and/or reading process of claim 44, wherein an electric field is applied to said plate and said conductive material layer with a strength of from $2.10 \times 10^6$ V/m to $2.98 \times 10^6$ V/m.

* * * * *

UNITED STATES PATENT AND TRADEMARK OFFICE
CERTIFICATE OF CORRECTION

PATENT NO. : 4,860,278
DATED : August 22, 1989
INVENTOR(S) : TAKASHI NAKAHARA

Page 1 of 2

It is certified that error appears in the above-identified patent and that said Letters Patent is hereby corrected as shown below:

COLUMN 1

Line 38, "elipsoidal" should read --ellipsoidal--.

COLUMN 2

Line 34, "records and/or reading" should read
--records and/or reads--.
Line 38, "having" should read --has--.
Line 58, "capale" should read --capable--.

COLUMN 7

Line 23, "a" should read --an--.

COLUMN 9

Line 54, "a" should read --an--.
Line 56, "therefrom a" should read --therefrom, a--.

COLUMN 11

Line 43, "is" should read --are--.

UNITED STATES PATENT AND TRADEMARK OFFICE
CERTIFICATE OF CORRECTION

PATENT NO. : 4,860,278
DATED : August 22, 1989
INVENTOR(S) : TAKASHI NAKAHARA

Page 2 of 2

It is certified that error appears in the above-identified patent and that said Letters Patent is hereby corrected as shown below:

COLUMN 12

Line 47, "is" should read --are--.

Signed and Sealed this

Twenty-fourth Day of December, 1991

Attest:

HARRY F. MANBECK, JR.

*Attesting Officer*  *Commissioner of Patents and Trademarks*